United States Patent
Michael

(10) Patent No.: US 11,360,567 B2
(45) Date of Patent: Jun. 14, 2022

(54) INTERACTING WITH A TRUE WIRELESS HEADSET

(71) Applicant: DSP Group Ltd., Herzliya (IL)

(72) Inventor: Nir Michael, Tel Aviv (IL)

(73) Assignee: DSP GROUP LTD., Herzliya (IL)

( * ) Notice: Subject to any disclaimer, the term of this patent is extended or adjusted under 35 U.S.C. 154(b) by 0 days.

(21) Appl. No.: 16/946,139

(22) Filed: Jun. 8, 2020

(65) Prior Publication Data

US 2020/0409468 A1 Dec. 31, 2020

Related U.S. Application Data

(60) Provisional application No. 62/867,239, filed on Jun. 27, 2019.

(51) Int. Cl.
*H04R 1/10* (2006.01)
*G06F 3/01* (2006.01)

(52) U.S. Cl.
CPC .......... *G06F 3/017* (2013.01); *H04R 1/1041* (2013.01); *G06F 2200/1636* (2013.01)

(58) Field of Classification Search
CPC ............. G06F 3/017; G06F 2200/1636; H04R 1/1041; H04R 2201/107; H04R 2460/03; H04R 3/00
See application file for complete search history.

(56) References Cited

U.S. PATENT DOCUMENTS

| | | | | |
|---|---|---|---|---|
| 2004/0204116 A1* | 10/2004 | Ben-Efraim | ...... | H04M 1/72448 455/564 |
| 2010/0116563 A1* | 5/2010 | Paradiso | ............... | G06F 3/0433 178/18.04 |
| 2011/0096036 A1* | 4/2011 | McIntosh | ................ | G06F 3/043 345/177 |
| 2013/0022214 A1* | 1/2013 | Dickins | ............... | G06F 3/04883 381/74 |
| 2014/0337036 A1* | 11/2014 | Haiut | ...................... | G06F 3/167 704/275 |
| 2017/0103420 A1* | 4/2017 | Ramasarma | ........ | G06Q 30/0267 |
| 2019/0072601 A1* | 3/2019 | Dzierwa | ............... | G08B 29/185 |
| 2019/0335000 A1* | 10/2019 | Zhang | ................. | H04L 12/2816 |

* cited by examiner

*Primary Examiner* — Jennifer N Welch
*Assistant Examiner* — Kc Chen
(74) *Attorney, Agent, or Firm* — Reches Patents

(57) ABSTRACT

A true wireless headset that may include a housing, a microphone that is mechanically coupled to the housing, wherein the microphone is configured to detect sound and output detection signals indicative of the sound, a tap detector that is configured to receive a first representation of the detection signals, and to process the first representation of the detection signals to determine whether a user tapped on the housing; and at least one additional circuitry that is configured to respond to a determination that the user tapped on the housing.

22 Claims, 5 Drawing Sheets

US 11,360,567 B2

INTERACTING WITH A TRUE WIRELESS HEADSET

CROSS-REFERENCE

This application claims priority from U.S. provisional patent Ser. No. 62/867,239 filing date Jun. 27, 2019 which is incorporated herein by reference.

BACKGROUND

True wireless headsets do not have external cables-even not cables that connect a right true wireless headset to a left true wireless headset.

True wireless headsets (also referred to as true wireless earbuds) are very compact and can be inserted in the human ear without substantially extending outside the human ear.

Some true wireless headsets do not have external mechanical buttons but may have a capacitive touch key detector that enable interaction with the true wireless headset.

The capacitive touch key senses a small capacitance change that occurs when a finger of a user is placed above a metal pad of the true wireless headset.

The metal pad should be positioned within the true wireless headset and should be large enough to senses the capacitive change. It has to be positioned below a thin plastic shield. Manufacturing of a large metal pad and the thin plastic shield is problematic. Using small metal pads reduces the sensitivity and the reliability of the detection of the capacitive change.

Furthermore—the capacitance detection may require to maintain the finger near the true wireless headset for a prolonged duration on order to properly detect the finger—thus this may complicate the control of the true wireless headset—and prevent the user from applying more complex control schemes—whereas the user is limited to a single stroke at a time.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

DETAILED DESCRIPTION OF THE DRAWINGS

Figure 1:
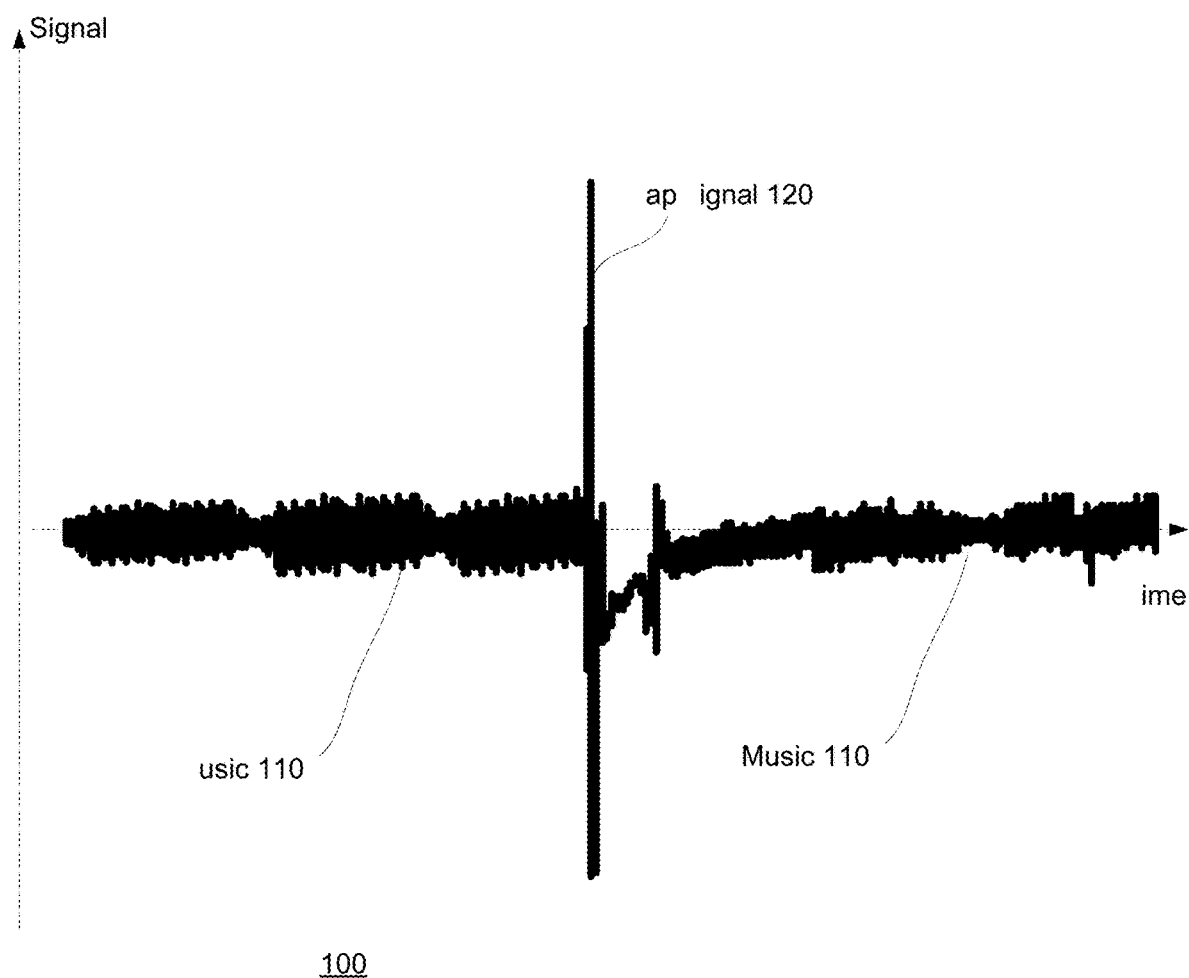
FIG. 1 illustrates an example of an acoustic signature of a tap and other audio signals such as music.

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

Because the illustrated embodiments of the present invention may for the most part, be implemented using electronic components and circuits known to those skilled in the art, details will not be explained in any greater extent than that considered necessary as illustrated above, for the understanding and appreciation of the underlying concepts of the present invention and in order not to obfuscate or distract from the teachings of the present invention.

Any reference to a true wireless headset should be applied mutatis mutandis to a reference to a method and to a reference to a non-transitory computer program product—and vice-verse.

There is provided a true wireless headset and a method for touch based control of a true wireless headset that is based on an analysis of an acoustic signature of a tap on the true wireless headset. The true wireless headset may include a microphone that is acoustically coupled to the housing of the true wireless headset. The microphone detects the sound generated when the user taps on the true wireless headset and a tap detector searches for the acoustic signature of a tap. Once the acoustic signature of a tap is detected the true wireless headset may react to the tap. The acoustic signature of a tap based detection may be accurate, simple to implement, prevents using bulky metal pads, highly accurate, require only short contact with the true wireless headset and facilitates a complex control scheme that may allow the user to provide fast sequences of taps.

There may be provided a true wireless headset that may include a housing, a microphone that may be mechanically coupled to the housing, wherein the microphone may be configured to detect sound and output detection signals indicative of the sound, a tap detector that may be configured to receive a first representation of the detection signals, and to process the first representation of the detection signals to determine whether a user tapped on the housing; and one or more additional circuitry that may be configured to respond to, at least a first determination that the user tapped on the housing.

The detection signals may be analog detection signals, wherein the true wireless headset may include an analog to digital converter that may be configured to convert the analog detection signals to digital detection signals.

The true wireless headset may include a tap filter that may be configured to generate the first representation of the detection signals by applying a filtering operation.

The tap filter may be a matched filter.

The tap detector may be configured to process the first representation of the detection signals by searching for an acoustic signature of the tap.

The acoustic signature of the tap may include up to a few hundred signals.

The detection signals may be analog detection signals, wherein the true wireless headset may include an analog to digital converter and a tap filter, wherein the analog to digital converter may be configured to convert the analog detection signals to digital detection signals; and wherein the tap filter that may be configured to apply a first filtering operation on the digital detection signals to provide to the tap detector the first representation of the detection signals.

The true wireless headset may include a voice trigger detector and a voice trigger filter, wherein the voice trigger filter may be configured to apply a second filtering operation on the digital detection signals to provide to the voice trigger detector a second representation of the detection signals, wherein the voice trigger detector may be configured to receive the second representation of the detection signals, and to process the second representation of the detection signals to determine whether the microphone sensed a voice trigger.

The voice trigger detector may be configured to process the second representation of the detection signals by searching for an acoustic signature of the voice trigger.

The acoustic signature of the voice trigger may include few thousand signals.

The true wireless headset wherein the at least one additional circuitry may be a controller that may be configured to control the true wireless headset based on a detection of at least one tap.

The true wireless headset may essentially of the housing, the microphone, the tap detector and the at least one additional circuitry.

The acoustic signature of a tap is sudden, short, and with high energy in comparison to the playback or audio from outside. FIG. 1 illustrates an example of graph 100 that illustrates a tap signal 110 (signal generated from a tap) and one or more other audio signals such as music 120.

The short duration of the acoustic signature of a tap allows to detect the tap is a relative short number of samples thus reducing the power consumption associated with the detection of the acoustic signature of a tap.

Voice-operated devices typically wake up by a voice trigger, detecting a wake up word spoken by the user, and then respond to a following command or query.

The number of samples that are needed for tap detection is much smaller than the numbers of samples needed for voice trigger detection—for example—few hundreds. This small number of samples results in a small MIPS consumption and energy consumption to be allocated for the tap detection.

The difference in numbers of samples may attributed to the following: (a) for voice trigger, the average frequency of the speaker is much lower, in order to grab voice trigger, at least a record of one or two seconds. The samples are cut to small chunks of at least 80 samples each, then they are converted to the frequency domain. On the other hand a tap detection may require calculating, in the time domain, a distance (for example an average distance) between few consecutive samples, and if there is a burst of energy, a tap is detected.

The true wireless headset may include a voice trigger detector that is fed by digital samples of audio signals sensed by the microphone. At least some of these digital samples may be fed to a tap detector.

The tap detector may be idle until the true wireless headset is inserted to the ear of the user—in order to reduce power consumption. The positioning of the true wireless headset within an ear may be detection in various manners.

Figure 2:
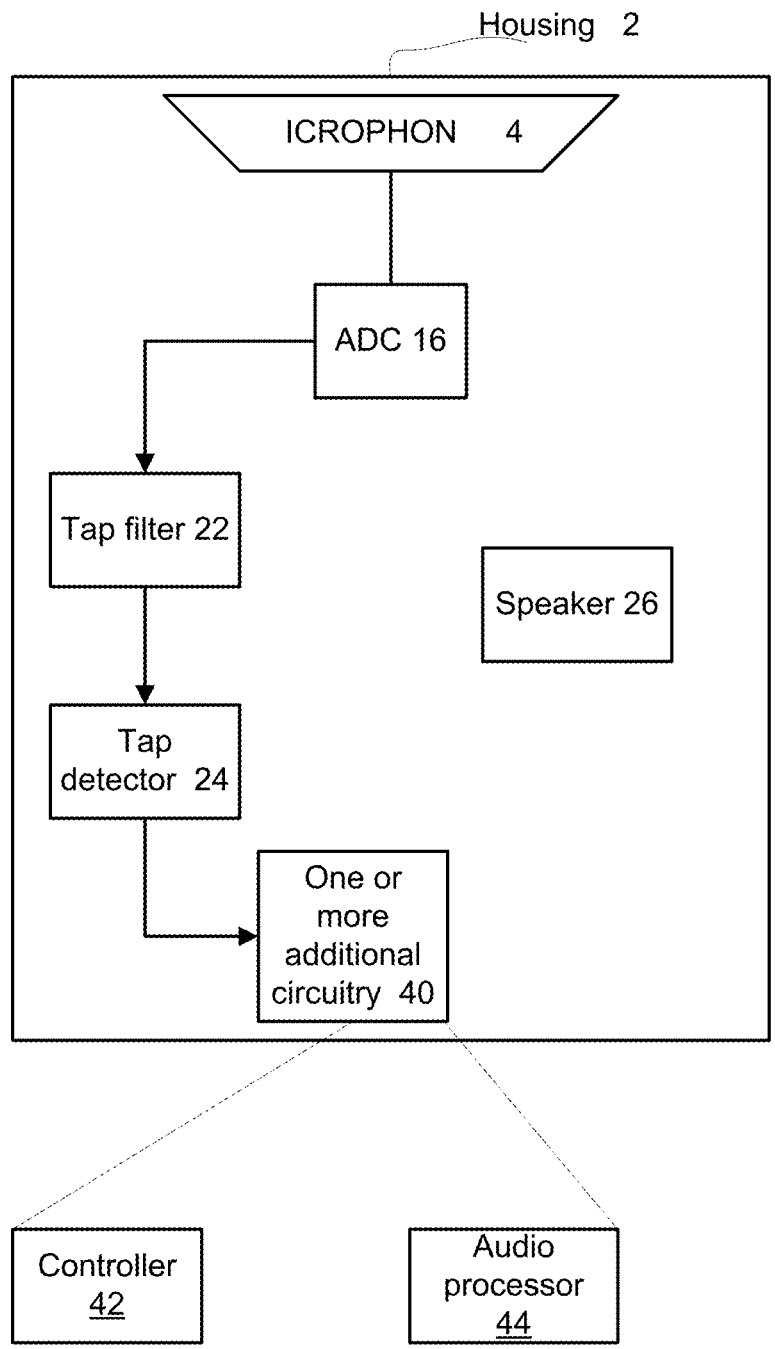
FIG. 2 illustrates an example of a true wireless headset.

FIG. 2 illustrates an example of true wireless headset 10.

The true wireless headset 10 includes a housing 12, a microphone 14, an analog to digital converter (ADC) 16, a tap filter 22, a tap detector 24, a speaker 26, and one or more additional circuitry 40 such as a controller 42 and an audio processor 44. Other circuits such as a wireless receiver for receiving an audio stream to be played by the speaker 26 are not shown.

The audio processor 44 may perform various operations such as echo cancellation, noise reduction, and the like.

Figure 3:
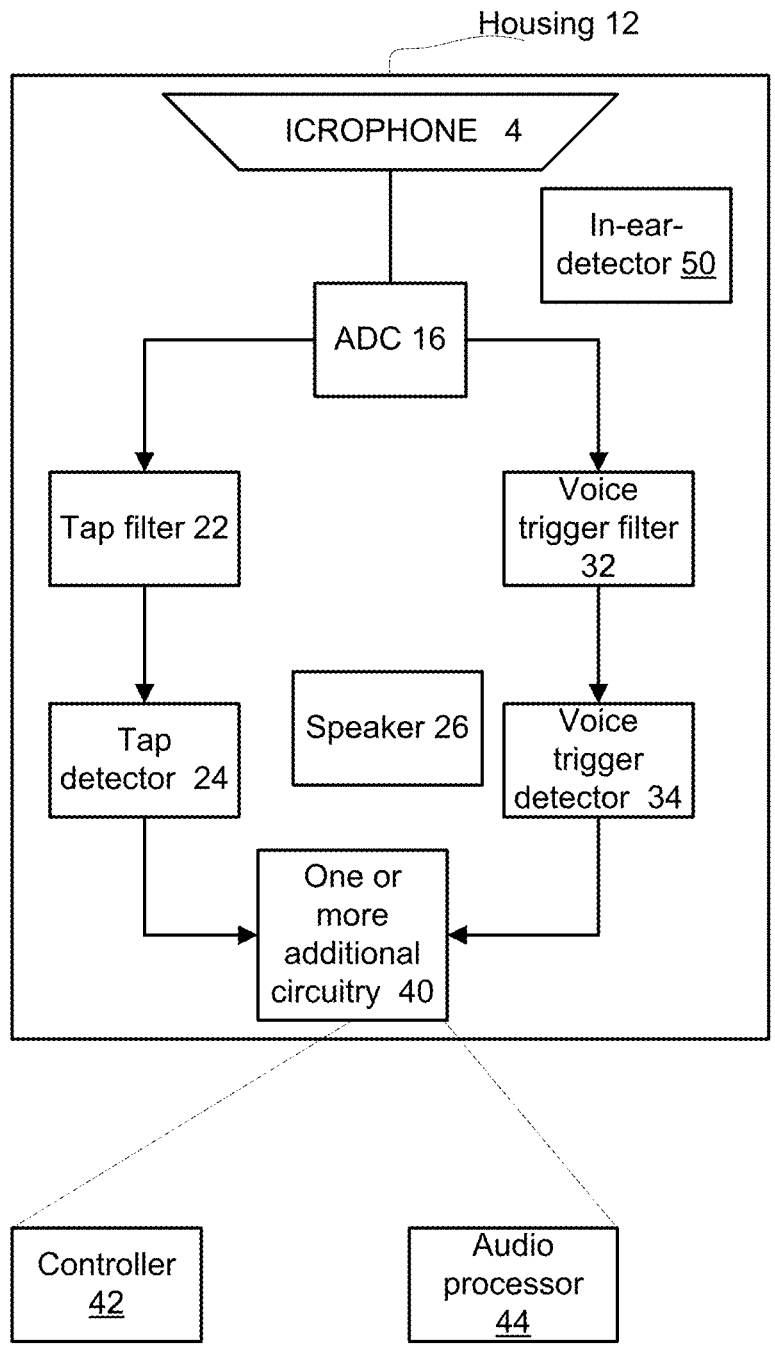
FIG. 3 illustrates an example of true wireless headset.

FIG. 3 illustrates an example of true wireless headset 11.

The true wireless headset 11 includes a housing 12, a microphone 14, an analog to digital converter (ADC) 16, a tap filter 22, a tap detector 24, a speaker 26, in-ear detector 50 for sensing when the true wireless headset is within the ear of a person, a voice trigger filter 32, a voice trigger detector 34, and one or more additional circuitry 40 such as a controller 42 and an audio processor 44. Other circuits such as a wireless receiver for receiving an audio stream to be played by the speaker 26 are not shown.

It should be noted that the microphone 14 may output digital detection signals and in this case the ADC 16 may not be connected after the microphone.

The ADC 16 is fed with detection signals that are analog detection signals from the microphone and outputs digital detection signals (also referred to as digital samples) that are sent to the voice trigger filter 32 (in FIG. 3 but not in FIG. 2), and to the tap filter 22 (in both FIGS. 2 and 3).

The tap filter 22 and the voice trigger filter may be digital filters. Alternatively, at least one filter may operate in the analog domain and the ADC does not precede such filter.

The rate of the filtered digital samples that are sent to the tap detector 24 may be a fraction (for example less than four percent) of the rate of the filtered digital samples sent to the voice trigger detector 34. The digital filters may be SAR filters or other filters.

The tap detection thus may use circuitry already existing in a true wireless headset—such as the microphone, the analog to digital converter—thus reducing the cost of implementation (as well as reducing the size) of tap detection based on the acoustic signature of tap.

Figure 4:
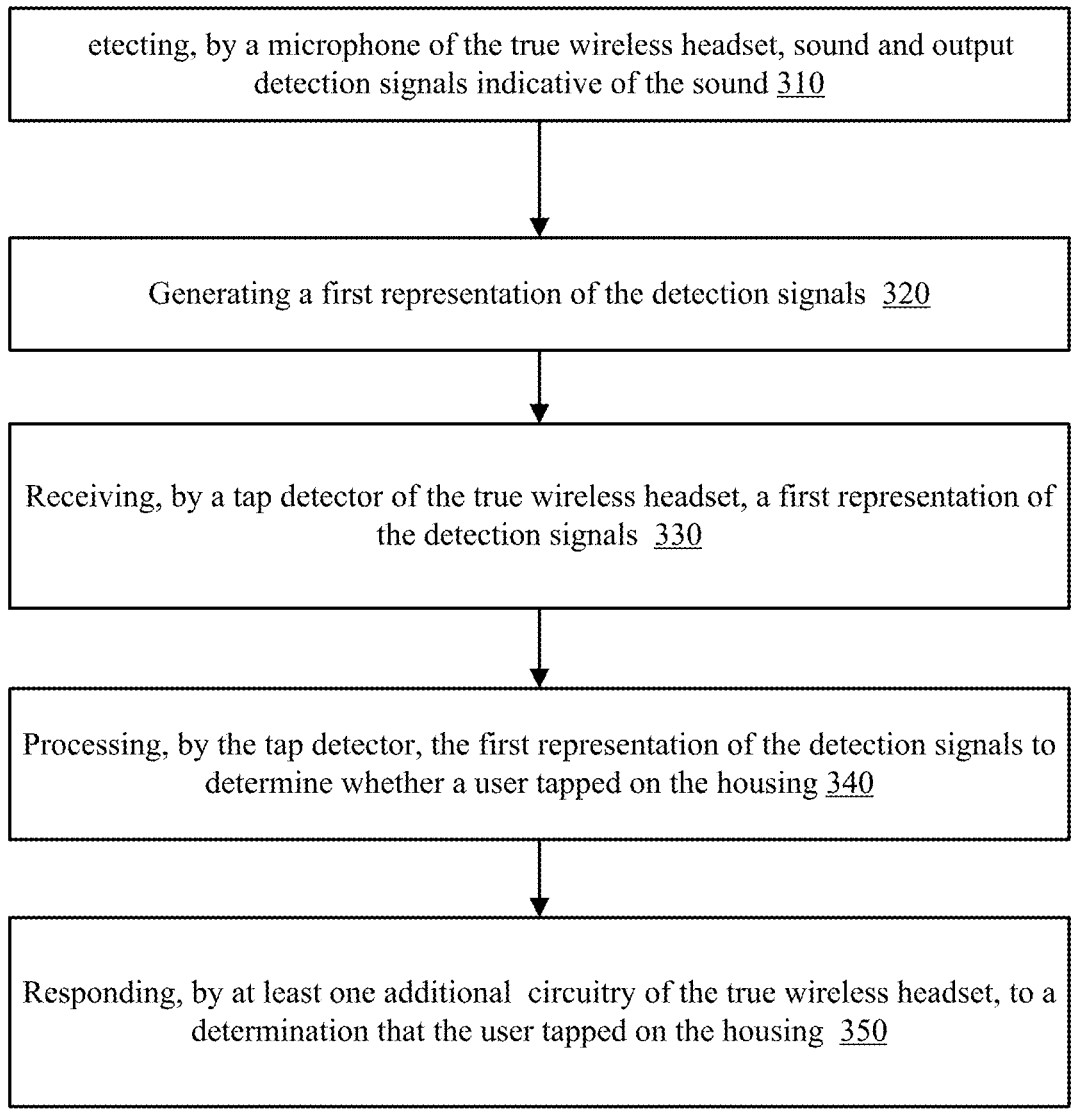
FIG. 4 illustrates an example of a method.

FIG. 4 illustrates method 300.

Method 300 is for tap detection in a true wireless headset. A user may control various functions by tapping at least one on the housing of the true wireless headset. The control is based on a mapping between commands and a tap or a tapping pattern that includes more than a single tap. The mapping may be set in advance, may be updated, or may be received or fed to the true wireless headset in any manner.

Method 300 may start by step 310 of detecting, by a microphone of the true wireless headset, sound and output detection signals indicative of the sound. The microphone is mechanically coupled to a housing of the true wireless headset. The mechanical coupling may be a direct coupling (microphone is connected to the housing) or indirect coupling. The mechanical coupling enable the microphone to sense a sound generated when the user taps the housing.

Step 310 may be followed by step 320 of generating a first representation of the detection signals. The first representation of the detection signals may equal the detection signals or may differ from the detection signals. The generating of the first representation may include, for example, at least one out of format changing (for example performing analog to digital conversion), filtering, sampling, and the like.

The detection signals may be analog detection signals, and step 320 may include converting, by an analog to digital converter of the true wireless headset, the analog detection signals to digital detection signals.

Step 320 may include generating, by a tap filter of the true wireless headset, the first representation of the detection signals by applying a first filtering operation.

The tap filter may be a matched filter or may be any other filter

The detection signals may be analog detection signals. Step 320 may include converting, by an analog to digital converter of the true wireless headset, the analog detection signals to digital detection signals; and applying, by a tap filter of the true wireless headset, a first filtering operation on the digital detection signals to provide to the tap detector the first representation of the detection signals Step 320 may be followed by step 330 of receiving, by a tap detector of the true wireless headset, a first representation of the detection signals.

Step 330 may be followed by step 340 of processing, by the tap detector, the first representation of the detection signals to determine whether a user tapped on the housing.

Step 340 may include processing, by the tap detector, the first representation of the detection signals by searching for an acoustic signature of the tap.

The acoustic signature of the tap may include up to few hundred signals.

Step 340 may be followed by step 350 of responding, by at least one additional circuitry of the true wireless headset, to a determination that the user tapped on the housing.

The at least one additional circuitry may be a controller, and step 350 may include controlling the true wireless headset based on a detection of at least one tap. The controlling may include controlling a microphone, a speaker of the true wireless headset, a tuner of the true wireless headset, and the like. The controller may be included in an integrated circuit, may be the integrated circuit, and the like.

Figure 5:
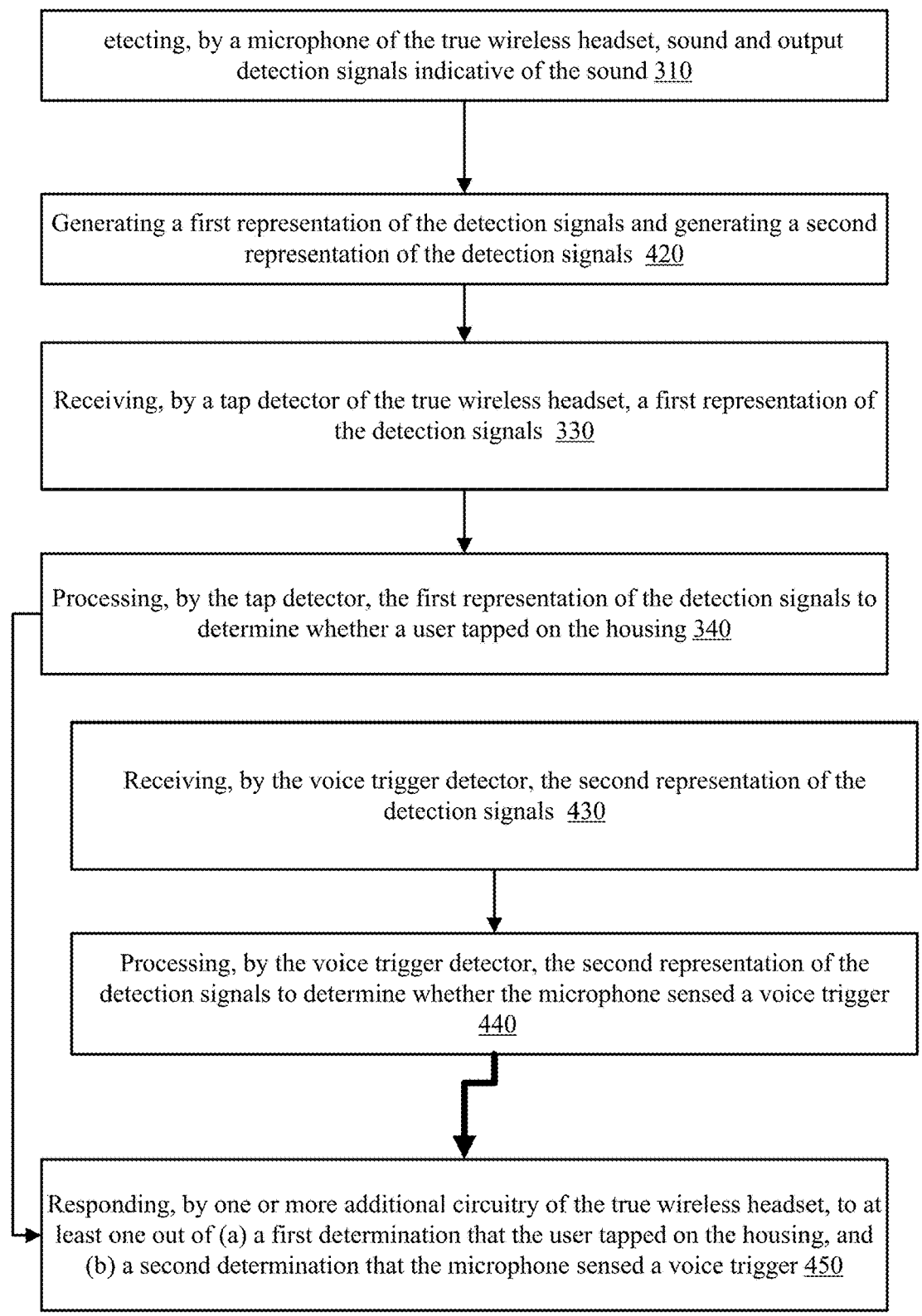
FIG. 5 illustrates an example of a method.

FIG. 5 illustrates method 400.

Method 400 is for tap detection in a true wireless headset.

Method 400 may start by step 310 of detecting, by a microphone of the true wireless headset, sound and output detection signals indicative of the sound. The microphone is mechanically coupled to a housing of the true wireless headset.

Step 310 may be followed by step 420 of generating a first representation of the detection signals and generating a second representation of the detection signals.

The first representation of the detection signals may equal the detection signals or may differ from the detection signals. The generating of the first representation may include, for example, at least one out of format changing (for example performing analog to digital conversion), filtering, sampling, and the like.

The second representation of the detection signals may equal the detection signals or may differ from the detection signals. The generating of the second representation may include, for example, at least one out of format changing (for example performing analog to digital conversion), filtering, sampling, and the like.

The detection signals may be analog detection signals, and step 420 may include converting, by an analog to digital converter of the true wireless headset, the analog detection signals to digital detection signals.

Step 420 may include generating, by a tap filter of the true wireless headset, the first representation of the detection signals by applying a first filtering operation.

The tap filter may be a matched filter or may be any other filter

The detection signals may be analog detection signals. Step 420 may include converting, by an analog to digital converter of the true wireless headset, the analog detection signals to digital detection signals; and applying, by a tap filter of the true wireless headset, a first filtering operation on the digital detection signals to provide to the tap detector the first representation of the detection signals Step 420 may include generating, by a voice trigger filter of the true wireless headset, the second representation of the detection signals by applying a second filtering operation.

The voice trigger filter may be a matched filter or may be any other filter

The detection signals may be analog detection signals. Step 420 may include converting, by an analog to digital converter of the true wireless headset, the analog detection signals to digital detection signals; and applying, by a voice trigger filter of the true wireless headset, a second filtering operation on the digital detection signals to provide to the voice trigger detector the second representation of the detection signals Step 420 may be followed by steps 330 and 430.

Step 330 may include receiving, by a tap detector of the true wireless headset, a first representation of the detection signals.

Step 330 may be followed by step 340 of processing, by the tap detector, the first representation of the detection signals to determine whether a user tapped on the housing Step 430 may include receiving, by the voice trigger detector, the second representation of the detection signals.

Step 430 may be followed by step 440 of processing, by the voice trigger detector, the second representation of the detection signals to determine whether the microphone sensed a voice trigger.

Step 340 and 440 may be followed by step 450 of responding, by one or more additional circuitry of the true wireless headset, to at least one out of (a) a first determination that the user tapped on the housing, and (b) a second determination that the microphone sensed a voice trigger.

The responding may include independently responding to the first determination, independently responding to the second determination, or responding to a combination to the first and second determining.

The following provides some non-limiting examples regarding the tap signal and at least some circuits related to the tap detection and/or voice trigger detection.

The tap filter may perform a correlation between a known signature of a tap and the digital signals—and the tap detector searches for a correlation result (such as a delta) that indicates that a tap was received. Yet another example of a tap filter may include filtering our signals that are voice signals of certain frequencies while maintaining signals within a higher frequency (that the certain frequencies) that represent a tap.

When tapping physically on a TWS there is a large burst of energy, the gap between two consecutive samples is very large (High frequency), and based on the response (which may be material dependent)—the tap detector can determine whether the housing was tapped.

The tap detection may be based on an energy difference or volume difference detector, that for example calculates the difference between energy or volume of consecutive samples (for example using a window of few—for example—three sampled) and if the difference is large enough then there is a tap.

The tap detection may use envelope detection—for detecting the envelope of a signal generated by the tap. A neural network May Be Used To Detect The Envelope.

The tap energy well exceeds the energy in speech to be detected by a voice trigger detector. The energy of a tap may exceed by at least ten DB (and even 20 DB) or more that the energy of speech (As detected by the microphone).

The change of energy following the beginning of the tap (for example from zero energy to maximal tap energy) within few samples—which is much steeper that the change of energy in a speech.

In the foregoing specification, the invention has been described with reference to specific examples of embodiments of the invention. It will, however, be evident that various modifications and changes may be made therein without departing from the broader spirit and scope of the invention as set forth in the appended claims.

Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures may be implemented which achieve the same functionality.

Any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermedial components. Likewise, any two components so associated can also be viewed as being "operably connected," or "operably coupled," to each other to achieve the desired functionality.

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

Also for example, in one embodiment, the illustrated examples may be implemented as circuitry located on a single integrated circuit or within a same device. Alternatively, the examples may be implemented as any number of separate integrated circuits or separate devices interconnected with each other in a suitable manner. The integrated circuit may be a system on chip, a general-purpose processor, a signal processor, an FPGA, a neural network integrated circuit, and the like.

However, other modifications, variations and alternatives are also possible. The specifications and drawings are, accordingly, to be regarded in an illustrative rather than in a restrictive sense.

There may be provide a method for operating the true wireless headset as illustrated above.

There may be provided a non-transitory computer program product that once executed causes a true wireless headset to detect a tap as illustrated above.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

We claim:

1. A true wireless headset comprising:
   a housing;
   a microphone that is mechanically coupled to the housing, wherein the microphone is configured to detect sound and output detection signals indicative of the sound;
   a tap detector that is configured to receive a first representation of the detection signals received from the microphone, and to process the first representation of the detection signals by applying a first filtering operation to determine whether a user tapped on the housing, wherein the tap detector is configured to process the first representation of the detection signals by searching for an acoustic signature of the tap;
   a voice trigger detector that is configured to receive a second representation of the detection signals received from the microphone, and to process the second representation of the detection signals to determine whether the microphone sensed a voice trigger for waking up a circuit,
   a voice trigger filter that is configured to apply a second filtering operation to provide to the voice trigger detector the second representation of the detection signals, wherein a rate of sending of the first representation of the detection signals is a fraction of a rate of sending of the second representation of the detection signal, and
   at least one additional circuitry that is configured to respond to a determination that the user tapped on the housing.

2. The true wireless headset according to claim 1, wherein the detection signals are analog detection signals, wherein the true wireless headset comprises an analog to digital converter that is configured to convert the analog detection signals to digital detection signals.

3. The true wireless headset according to claim 1, wherein the fraction is less than four percent.

4. The true wireless headset according to claim 1, wherein the tap filter is a matched filter.

5. The true wireless headset according to claim 1, wherein the acoustic signature of the tap comprises up to few hundred signals.

6. The true wireless headset according to claim 1, wherein the detection signals are analog detection signals, wherein the true wireless headset comprises an analog to digital converter, wherein the analog to digital converter is configured to convert the analog detection signals to digital detection signals; wherein the tap filter is configured to apply the first filtering operation on the digital detection signals; and wherein the voice trigger filter is configured to apply the second filtering operation on the digital detection signals.

7. The true wireless headset according to claim 1 wherein the tap detector is configured to calculate an energy difference between consecutive signals of the first representation of the detection signals within a window of three signals of the first representation of the detection signals.

8. The true wireless headset according to claim 1, wherein the voice trigger detector is configured to process the second representation of the detection signals by searching for an acoustic signature of the voice trigger; wherein the acoustic signature of the voice trigger comprises few thousand signals.

9. The true wireless headset according to claim 1 wherein the tap detector is configured to calculate a volume difference between consecutive signals of the first representation of the detection signals within a window of three signals of the first representation of the detection signals.

10. The true wireless headset according to claim 1 wherein the at least one additional circuitry is a controller that is configured to control the true wireless headset based on a detection of at least one tap.

11. The true wireless headset according to claim 1 that consist essentially of the housing, the microphone, the tap detector, the tap filter, the voice trigger detector, the voice trigger filter, and the at least one additional circuitry.

12. A method for tap detection in a true wireless headset, the method comprises:
   detecting, by a microphone of the true wireless headset, sound and output detection signals indicative of the sound, wherein the microphone is mechanically coupled to a housing of the true wireless headset;
   applying, by a tap filter of the true wireless headset, a first filtering operation to provide a first representation of the detection signals received from the microphone;
   receiving, by a tap detector of the true wireless headset, the first representation of the detection signals;
   processing, by the tap detector, the first representation of the detection signals to determine whether a user tapped on the housing;
   processing, by the tap detector, the first representation of the detection signals by searching for an acoustic signature of the tap;
   applying, by a voice trigger filter of the true wireless headset, a second filtering operation to provide a second representation of the detection signals received from the microphone, wherein a rate of sending of the first representation of the detection signals is a fraction of a rate of sending of the second representation of the detection signal,
   receiving, by a voice trigger detector of the true wireless headset, the second representation of the detection signals; and
   processing, by the voice trigger detector, the second representation of the detection signals to determine whether the microphone sensed a voice trigger for waking up a circuit, and
   responding, by at least one additional circuitry of the true wireless headset, to a determination that the user tapped on the housing.

13. The method according to claim 12, wherein the detection signals are analog detection signals, wherein the method comprises converting, by an analog to digital converter of the true wireless headset, the analog detection signals to digital detection signals.

14. The method according to claim 12, wherein the fraction is less than four percent.

15. The method according to claim 12, wherein the tap filter is a matched filter.

16. The method according to claim 12, wherein the acoustic signature of the tap comprises up to few hundred signals.

17. The method according to claim 12, wherein the detection signals are analog detection signals, wherein the method comprises converting, by an analog to digital converter of the true wireless headset, the analog detection signals to digital detection signals; and wherein the first filtering operation and the second filtering operation are applied on the digital detection signals.

18. The method according to claim 12, comprising calculating, by the tap detector, calculate a volume difference between consecutive signals of the first representation of the detection signals within a window of three signals of the first representation of the detection signals.

19. The method according to claim 12, wherein the processing, by the voice trigger detector, comprises searching for an acoustic signature of the voice trigger; wherein the acoustic signature of the voice trigger comprises few thousand signals.

20. The method according to claim 12, comprising calculating, by the tap detector, an energy difference between consecutive signals of the first representation of the detection signals within a window of three signals of the first representation of the detection signals.

21. The method according to claim 12 wherein the at least one additional circuitry is a controller, wherein the responding comprises controlling the true wireless headset based on a detection of at least one tap.

22. A non-transitory computer program product that stores instructions that once executed by a true wireless headset cause the true wireless headset to execute the steps of:
   detecting, by a microphone of the true wireless headset, sound and output detection signals indicative of the sound, wherein the microphone is mechanically coupled to a housing of the true wireless headset;
   applying, by a tap filter of the true wireless headset, a first filtering operation to provide a first representation of the detection signals received from the microphone;
   receiving, by a tap detector of the true wireless headset, a first representation of the detection signals;
   processing, by the tap detector, the first representation of the detection signals to determine whether a user tapped on the housing;
   processing, by the tap detector, the first representation of the detection signals by searching for an acoustic signature of the tap;
   applying, by a voice trigger filter of the true wireless headset, a second filtering operation to provide a second representation of the detection signals received from the microphone, wherein a rate of sending of the first representation of the detection signals is a fraction of a rate of sending of the second representation of the detection signal;
   receiving, by a voice trigger detector of the true wireless headset, the second representation of the detection signals; and
   processing, by the voice trigger detector, the second representation of the detection signals to determine whether the microphone sensed a voice trigger for waking up a circuit, and
   responding, by at least one additional circuitry of the true wireless headset, to a determination that the user tapped on the housing.

* * * * *